United States Patent [19]

Myers et al.

[11] Patent Number: 4,718,709
[45] Date of Patent: Jan. 12, 1988

[54] ORBITAL MANEUVERING VEHICLE END EFFECTORS

[75] Inventors: W. Neill Myers; John C. Forbes, both of Huntsville, Ala.; Wayne L. Barnes, Petersburg, Tenn.

[73] Assignee: The United States of America as represented by the Administrator of the National Aeronautics and Space Administration, Washington, D.C.

[21] Appl. No.: 942,159

[22] Filed: Dec. 16, 1984

[51] Int. Cl.[4] .................. B66C 1/10; B25J 3/00
[52] U.S. Cl. .................. 294/106; 294/86.4; 244/161
[58] Field of Search .......... 294/106, 86.4, 87.1, 294/119.3, 98.1, 907, 902; 414/735, 730, 4; 244/161, 160, 162; 901/30, 33, 39

[56] References Cited

U.S. PATENT DOCUMENTS

| 4,068,763 | 1/1978 | Fletcher et al. | 414/4 |
| 4,573,727 | 3/1986 | Iikura | 294/106 |
| 4,623,183 | 11/1986 | Aomori | 294/106 |

FOREIGN PATENT DOCUMENTS 1154199  7/1985  U.S.S.R. .................. 294/106

Primary Examiner—James B. Marbert
Attorney, Agent, or Firm—William J. Sheehan; John R. Manning; Leon D. Wofford, Jr.

[57] ABSTRACT

An end effector device (A) for grasping and holding an article such as a handle (18) of a space telescope is disclosed. The device includes a V-shaped capture window (74) defined as inclined surfaces (76, 78) in parallel face plates (22, 24) which converge toward a retainer recess (54) in which the handle is retained. A pivotal finger (30) meshes with a pair of pivoted fingers (26, 28) which rotate in counterrotation. The fingers rotate to pull a handle within the capture window into recess (54) where latches (50) lock handle (18) in the recess. To align the capture window, plates (22, 24) may be cocked plus or minus five degrees on base (64).

19 Claims, 4 Drawing Figures

ORBITAL MANEUVERING VEHICLE END EFFECTORS

ORIGIN OF THE INVENTION

The invention described herein was made by employees of the U.S. Government and may be manufactured and used by or for the Government for Government purposes without the payment of any royalties thereon or therefor.

BACKGROUND OF THE INVENTION

The invention relates to end effector devices for grasping objects in space and in other applications. In particular, the invention relates to end effectors mounted to an orbital maneuvering vehicle for grasping the berthing handles of a space telescope.

While various end effector devices such as those in U.S. Pat. Nos. 3,268,091, 1,025,725, and 4,068,763 have been known, they have not been entirely satisfactory for capturing, gripping and retaining free articles in space. In particular, none of the prior art end effectors have the ability to satisfy all of the unique requirements for the berthing of a space telescope for servicing.

Accordingly, an object of the invention is to provide an end effector device having a relatively large capture envelope for capturing the handles of a space telescope.

Another object of the invention is to provide an end effector device having counterrotating meshing fingers capable of pulling in the handles of a space telescope with at least two hundred (200) pounds force.

Another object of the invention is to provide an end effector device having the ability to capture a handle or other object without precise angular alignment and particularly wherein the grasping fingers may be cocked within a prescribed interval of degrees with respect to the telescope handles.

Another object of the invention is to provide an end effector device having the ability to lock the object to the end effector structure once captured to thereby keep the drive mechanism from having to carry the load of retaining the object in the end effector device.

Still another object of the invention is to provide an end effector device having latches which lock the object in the end effector device after capture and which may be released to free the object after servicing of the object.

SUMMARY OF THE INVENTION

The above objects are accomplished according to the present invention by providing an end effector device which includes a base and parallel face plates carried on the base in a spaced apart manner. A pair of pivotal fingers are carried by the face plates for rotation in one direction, and an intermeshing finger is pivotally carried by the face plates for rotation in the opposite direction in a manner such that the intermeshing finger and pair of fingers move in a counterrotating fashion for intermeshing. V-shaped guide surfaces are formed in the face plates which taper inwardly and terminate at a recess which conforms in shape generally to that of the object being handled. The V-shaped guide surfaces define a capture envelope in which the object may be captured. Once captured, the counterrotating fingers grasp the object and pull the same into the recess. In the recess, latches are provided for locking the object in the recess and an actuator is provided for locking and releasing the latches. A drive for the rotating fingers is provided by a motor and a speed reducer which reduces the speed but increases the torque of the rotating fingers so that a sufficient pull is provided for pulling in large articles such as the handles of a space telescope. To enhance the capture capability, the face plates may be cocked relative to the base when the space handles are not in proper angular alignment with the end effector device.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, an orbital maneuvering vehicle 10 is illustrated in an earth orbit along with a space telescope 12. The orbital maneuvering vehicle 10 is provided with three end effector devices, designated generally as A, constructed in accordance with the present invention. The end effector devices may be attached by remote manipulator arms 16 which supply power and control to the end effector devices in a conventional manner for operation. Space telescope 12 comprises telescope handles 18 on the end of the telescope. These handles are commonly referred to as berthing handles. These handles are utilized in accordance with the present invention to be grasped by the end effector devices of the orbital maneuvering vehicle. In this manner, the orbital maneuvering vehicle may be docked with the space telescope for servicing.

Figure 1:
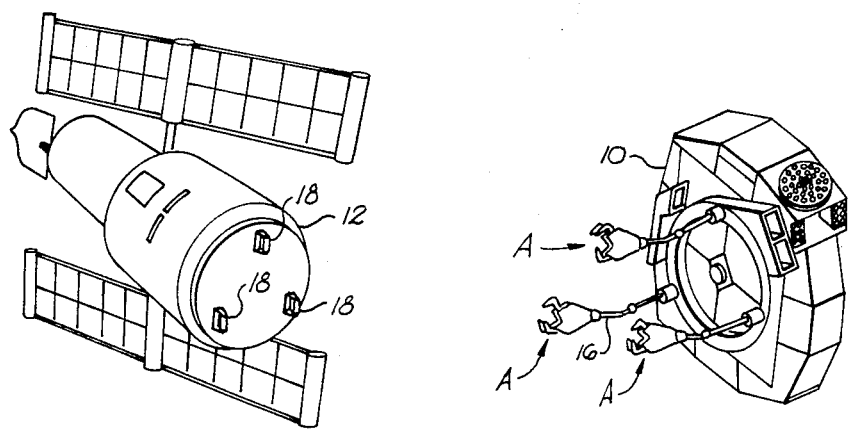
FIG. 1 is a perspective view illustrating an orbital space vehicle having end effectors constructed in accordance with the present invention for berthing with a space telescope.
Figure 4:
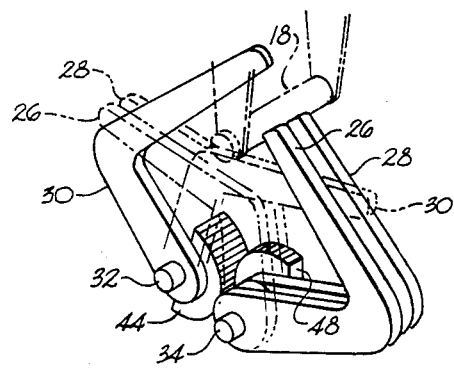
FIG. 4 is a perspective view of intermeshing fingers and counterrotating drive therefore constructed in accordance with the present invention.
Figure 2:
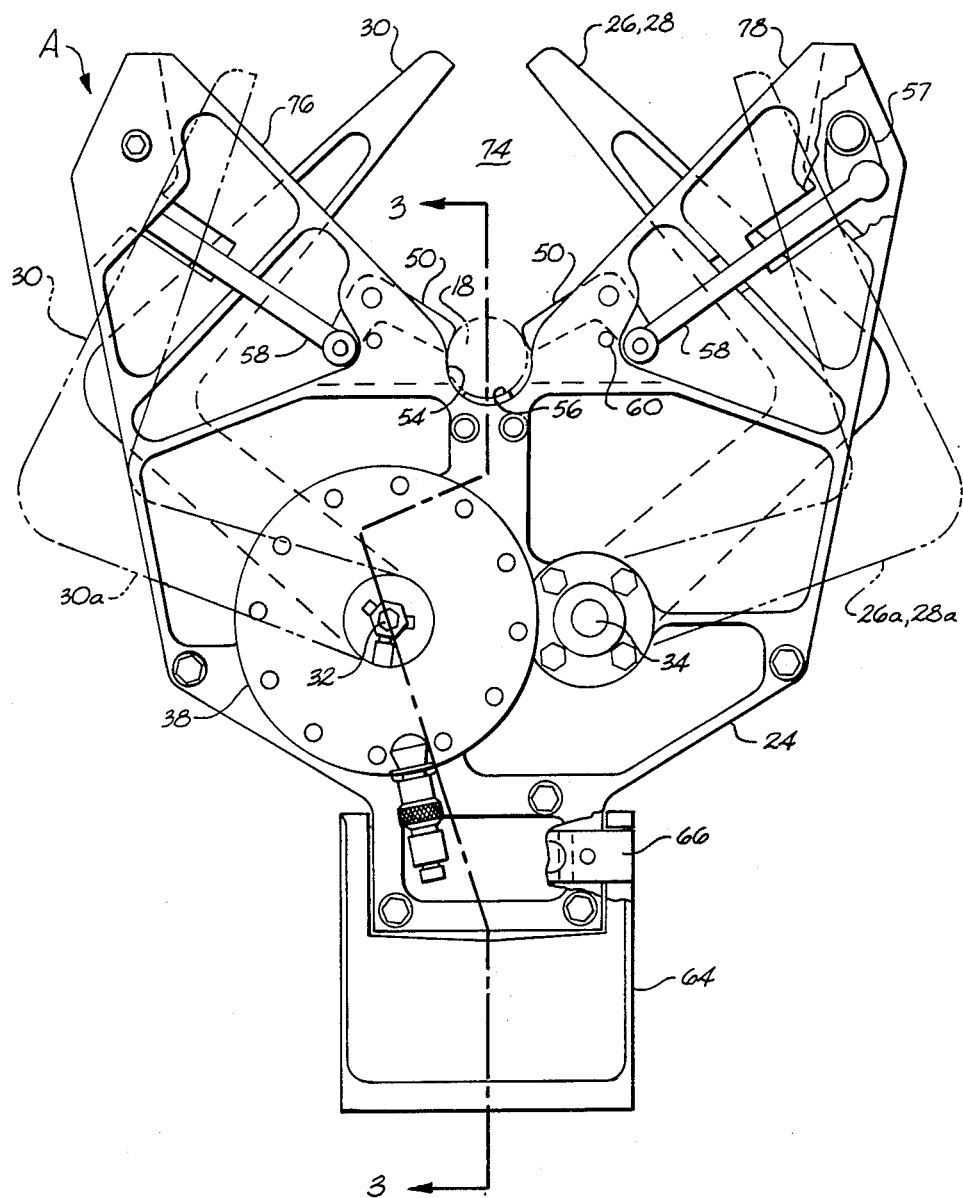
FIG. 2 is an elevation view with parts cut away illustrating an end effector device constructed in accordance with the present invention.
Figure 3:
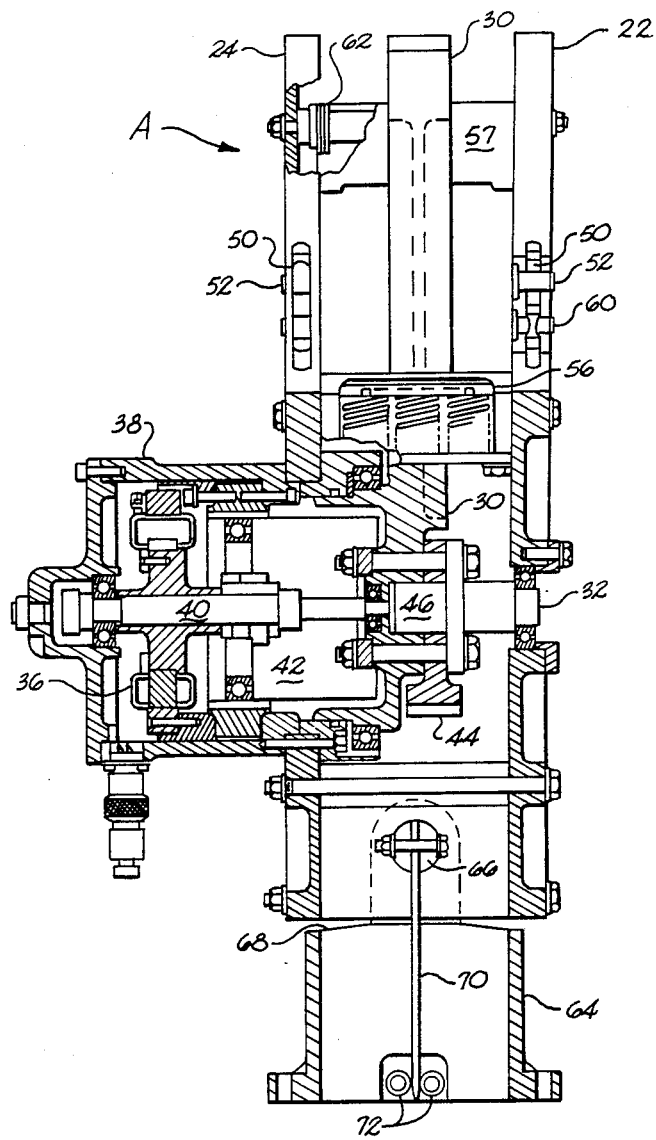
FIG. 3 is a sectional view taken along line 3—3 of FIG. 2.

As can best be seen in FIGS. 2 and 3, each end effector device A includes plate means in the form of a pair of spaced parallel face plates 22 and 24. The face plates are separated by rotatable intermeshing finger means in the form of a pair of fingers 26 and 28 and an intermediate finger 30. Fingers 26 and 28 rotate in counterrotation to intermediate finger 30 so that the fingers intermesh. Intermediate finger 30 rotates about a pivot axis and center 32 while fingers 26 and 28 rotate about a center pivot axis 34 laterally offset with respect to center 32 but in the same horizontal plane.

Drive means is provided for rotating the fingers in the form of a motor 36 having a housing 38. The rotor of the motor is mounted on a shaft 40 and the stator of the motor is centered in the housing 38. Mounted to the motor output shaft 40 is a speed reducing means which provides a speed reduction and a torque multiplication factor of one hundred sixty (160). The speed reducer is preferably a Harmonic drive, model HDC-1M-160-2A, manufactured by the Harmonic Drive Division of U.S.M. Corporation, Wakefield, Mass. The operating principle of the Harmonic drive is that it uses a rotating eliptical element to produce rhythmic deformation of a toothed elastic member reacting against a toothed reaction member. Differing tooth members on the meshing elements produce reduced output motion with corresponding multiplication of torque. Ratios between about sixty to one (60:1) and two hundred to one (200:1) can be achieved in a single pass with the Harmonic drive.

Finger 30 is mounted along with a gear section 44 on a shaft 46. Motor 36, Harmonic speed reducer 42, finger 30, gear section 44, and shaft 46, rotate about center 32. Gear section 44 meshes with a gear section 48 which is attached to fingers 26 and 28 to rotate these fingers in counterrotation to finger 30.

Retainer means for retaining handle 18 in a latched position in the end effector device is provided by latch means incorporated into face plates 22 and 24 which include latches 50 which rotate about centers 52. Latches 50 serve to retain the telescope handles in a retainer recess 54. The telescope handle or other object is held firmly against the latches 50 by a spring-loaded pad 56. Means for actuating the latches 50 is provided whereby the latches are retracted to release the telescope handle by movement of fingers 26, 28, and 30 to a full open position. In the full open position, the fingers contact and rotate cams 57, only one of which may be seen in the cut away view of FIG. 2. However, it is to be understood that a second cam is located in a corresponding location to be contacted by intermediate finger 30. Rotation of cams 57 retracts latches 50 by link means in the form of linkage arms 58 pivotally connected to latches 50 and cams 57. The latches are held or locked in the deployed position against stops 60 by means of torsion springs 62 within cams 57.

The face plate and finger assembly is mounted to a base 64 by a pivot pin 66. This pivotal mount allows the face plate and finger assembly to cock a prescribed number of degrees, preferably plus or minus five (5) degrees, until abutment shoulder surfaces 68 are reached. A leaf spring 70 is attached to pivot pin 66 and is retained in base 64 by pins 72. The leaf spring provides centering of the face plate and finger assembly.

In operation, in order to affect docking of the orbital maneuvering vehicle 10 with the handles 18 of the space telescope 12, the orbital maneuvering vehicle approaches the space telescope until the handles are within the capture envelope 74 defined by surfaces 76 and 78 formed in the face plates 22 and 24 which act as means for guiding handle 18 into recess 54. The L-shaped fingers 26, 28 and 30 are activated at this time trapping the handle and forcing the handle into recess 54. Initially, the fingers are pivoted to a completely open position wherein finger bases 30a, 26a, 28a are generally horizontal. The guide surfaces 76,78 are entirely clear for guiding handle 18 into the "V" 74 whereupon the fingers counterrotate to pull the handles into recess 54.

As the fingers move in counterrotation, the face plate and finger assembly may cock about pivot 66 to allow the handle to fully enter recess 54 and engage all four latches 50. When fully received in recess 54, the handle of the space telescope will engage and depress spring-loaded pad 56 and be resiliently retained in recess 54. The handle will bottom out on face plates 22 and 24.

Current to motor 36 will rise and the motor will be cut off by a current limiting switch. At this point, the fingers 26, 28, and 30 may be backed off and the telescope handles will be retained against latches 50 by spring-loaded pad 56. This prevents the telescope handling loads from being imparted on the drive mechanism.

When the telescope handles are to be released, fingers 26, 28, and 30 are moved to the full open position. In this position, the fingers actuate cams 57 which retract latches 50 by way of links 58 and free the telescope handles or other object being gripped. When cams 57 have moved through full travel, the motor current will again rise and the motor will be cut off by conventional current limiting switch.

While a preferred embodiment of the invention has been described using specific terms, such description is for illustrative purposes only, and it is to be understood that changes and variations may be made without departing from the spirit or scope of the following claims.

What is claimed is:

1. An end effector device for grasping the handle of a space telescope and the like comprising:
   a base;
   a pair of spaced face plates carried by said base;
   a pair of pivotal fingers carried by said face plates;
   an intermediate pivotal finger carried by said face plates meshing with said pair of pivotal fingers in a counterrotating motion;
   retainer means carried by said face plates for retaining said handle in a latched position;
   guide means carried by said face plates for guiding said handles toward said retainer means; and
   drive means for rotating said pair of fingers and said intermediate finger in counterrotation with respect to one another in a manner that said fingers engage said handle and move said handle towards said retainer means for retention therein.

2. The device of claim 1 wherein said retainer means comprises a recess corresponding in shape to said handles for receiving said handles.

3. The device of claim 2 wherein said retainer means includes latch means for engaging said handle received in said recess for latching said handles in said recess and actuating means for locking said latch means and releasing said latch means.

4. The device of claim 3 wherein said actuating means includes a cam engagable by at least one of said fingers, and linkage means connecting said cam with said latch means so that rotation of said fingers to an open position releases said latches.

5. The device of claim 4 including biasing means urging said latches in a locked position which is overcome by said cam and linkage means when said at least one finger is rotated to said open position.

6. The device of claim 2 wherein said recess includes a spring-loaded pad which is compressed by said handle to resiliently retain said handle in said recess.

7. The device of claim 1 wherein said drive means comprises a motor, and speed reducer means connected to said motor which provides a speed reduction and a torque multiplication, said speed reducer having an output connected to said fingers for rotating said fingers at a reduced speed and with an increased torque.

8. The device of claim 7 wherein said pair of fingers rotate about a first pivot and said intermediate finger rotates about a second pivot which is offset with respect to said first pivot, and gear means connected to said output of said speed reducing means interconnecting said pair of fingers and said intermediate finger for counterrotation at reduced speeds and increased torque.

9. The device of claim 1 wherein said base includes a pivot which allows said face plates and fingers to be cocked a number of degrees in order to facilitate capturing of said telescope handles.

10. The device of claim 9 wherein said base includes a tapered shoulder and said face plates rock against said shoulder to limit cocking of said face plates.

11. An end effector device for grasping a handle of a space telescope and the like comprising:
a base;
a plate means carried by said base;
a plurality of intermeshing pivotal fingers rotatably carried by said plate means in counterrotation with respect to one another in an intermeshing manner;
drive means for driving said pivotal fingers in counterrotation;
recess means formed in said plate means conforming generally to the shape of said handle for receiving said handle pulled into said recess by engagement in counterrotation of said intermeshing fingers; and
latch means for latching said handle in said recess means to relieve the drive means of said fingers.

12. The device of claim 11 including a spring-loaded pad carried by said recess for resiliently engaging said handle and assisting in the retention of said handle in said recess.

13. The device of claim 11 wherein said drive means comprises a motor having a motor output; speed reducing means connected to said motor output for producing a drive output having a reduced speed and increased torque, and said counterrotating fingers being operatively connected to said drive output of said speed reducing means.

14. The device of claim 13 wherein said intermeshing finger means comprises two pivotal fingers carried by a first pivot axis and a third pivotal finger carried by a second pivot axis offset from said pivot axis which intermesh and counterrotate with said two fingers.

15. The device of claim 11 including actuating means for releasing said latch.

16. An end effector device for grasping an object comprising:
a base;
plate means carried by said base;
a recess formed in said plate means for receiving said object;
a pair of inwardly tapered guide surfaces formed in said plate means tapering inwardly towards said recess for positively guiding said object toward said recess;
intermeshing pivotal finger means rotating in counterrotation with one another to mesh and guide said object into said recess;
drive means for rotating said intermeshing pivotal finger means; and
means to pivot said plate means relative to said base so that an aligned capture window is defined within which said object may be captured by said guide surfaces to guide said object into said recess.

17. The device of claim 16 wherein said guide surface means comprises a generally V-shaped window formed in said plate means which tapers to said recess.

18. The device of claim 16 wherein said base means comprises a tapered shoulder against which said plate means rocks to cock said plate means and said guide surfaces with respect to said object for aligning of said capture window, and resilient means attaching said plate means to said base means to facilitate rocking of said plate means and said base relative to each other.

19. The device of claim 16 wherein said drive means comprises a motor having a motor output and speed reducing means connected to said motor output for providing a drive output to said intermeshing pivotal finger means which reduces the rotational speed of said fingers at an increased torque.

* * * * *

UNITED STATES PATENT AND TRADEMARK OFFICE
CERTIFICATE OF CORRECTION

PATENT NO. : 4,718,709

DATED : January 12, 1988

INVENTOR(S) : W. Neill Myers, et al.

It is certified that error appears in the above-identified patent and that said Letters Patent is hereby corrected as shown below:

Change filing date [22] as follows:

-- [22] Filed: December 16, 1986 --

Signed and Sealed this

Twenty-seventh Day of September, 1988

Attest:

DONALD J. QUIGG

*Attesting Officer*    *Commissioner of Patents and Trademarks*